US007075191B2

(12) United States Patent
Davison

(10) Patent No.: US 7,075,191 B2
(45) Date of Patent: Jul. 11, 2006

(54) WIND AND WATER POWER GENERATION DEVICE USING A RAIL SYSTEM

(75) Inventor: Fred E. Davison, Highwood, MT (US)

(73) Assignee: Environmental Energy Systems, Inc., Highwood, MT (US)

( * ) Notice: Subject to any disclaimer, the term of this patent is extended or adjusted under 35 U.S.C. 154(b) by 0 days.

(21) Appl. No.: 10/467,589

(22) PCT Filed: Jul. 3, 2001

(86) PCT No.: PCT/US01/21553

§ 371 (c)(1),
(2), (4) Date: Aug. 7, 2003

(87) PCT Pub. No.: WO02/02934

PCT Pub. Date: Jan. 10, 2002

(65) Prior Publication Data

US 2004/0080166 A1 Apr. 29, 2004

Related U.S. Application Data

(60) Provisional application No. 60/215,794, filed on Jul. 5, 2000.

(51) Int. Cl.
F03B 13/00 (2006.01)
F03B 13/10 (2006.01)
H02P 9/04 (2006.01)
F03D 9/00 (2006.01)

(52) U.S. Cl. .................... 290/54; 290/55; 290/43; 290/44

(58) Field of Classification Search .................. 290/44, 290/55, 43, 54; 415/7, 4.2, 2.1; 416/11, 416/8; 114/102.16
See application file for complete search history.

(56) References Cited

U.S. PATENT DOCUMENTS

| 1,923,971 | A | * | 8/1933 | Evans | 290/4 R |
| 3,730,643 | A | | 5/1973 | Davison | 416/8 |
| 3,927,330 | A | * | 12/1975 | Skorupinski | 290/54 |
| 4,163,905 | A | | 8/1979 | Davison | 290/54 |
| 4,170,738 | A | * | 10/1979 | Smith | 290/42 |
| 4,589,344 | A | * | 5/1986 | Davison | 104/24 |
| 4,832,569 | A | * | 5/1989 | Samuelsen et al. | 416/17 |
| 4,859,146 | A | * | 8/1989 | Labrador | 416/8 |

(Continued)

OTHER PUBLICATIONS

R. E. Powe, H. W. Townes, D. O. Blackketter—"Development of a Large Capacity Wind Powered Electrical Generating System: A Concept"; Research Report, Mechanical Engineering Dept. Montana State University, Sep. 1, 1973.
Julius D. Madaras, "Big Electric Plant Run by Wind"; *Popular Science Monthly*, Jan. 1932.
Laird B. Gogins, "Biggest Wind Machine: 200-ft Turbine Blades Mounted on Rail Cars"; *News Trends*.

(Continued)

*Primary Examiner*—Julio Gonzalez R.
(74) *Attorney, Agent, or Firm*—Thorpe North & Western, LLP

(57) ABSTRACT

A power generation assembly for use in generating electrical power from air or water currents includes a rail system forming a loop, a vane assembly having a frame and at least one vane, and a car assembly slidably mounted to the rail, including a linkage portion coupled to the frame of the vane assembly and a power-take-off arrangement includes an element that is operatively coupled to the car assembly and a drive wheel coupled to a generator and configured to take power off the moving car assembly by the drive wheels being rotated by the passing power take off element.

18 Claims, 20 Drawing Sheets

U.S. PATENT DOCUMENTS

| | | | |
|---|---|---|---|
| 5,313,103 A | 5/1994 | Hickey | 290/54 |
| 5,350,273 A * | 9/1994 | Hector et al. | 415/4.1 |
| 5,386,146 A | 1/1995 | Hickey | 290/55 |
| 5,758,911 A | 6/1998 | Gerhardt | 290/55 |
| 5,992,341 A | 11/1999 | Gerhardt | 114/102.16 |
| 6,629,815 B1 * | 10/2003 | Lusk | 415/907 |
| 6,672,522 B1 * | 1/2004 | Lee et al. | 290/55 |
| 2004/0164562 A1 * | 8/2004 | Latyshev | 290/55 |

OTHER PUBLICATIONS

"Integrated Wind-Hydroelectric Generation—Integration of Wind and Hydroelectric Power"; *Montana Rural Electric News*.

James McCawley, "Dynaship"; *Sea Frontiers Magazine*, Jan.-Feb. 1973.

A catamaran with Venetian Blinds—Popular Science, Nov. 1974 p. 80.

* cited by examiner

FIG. 6 (A,B,C)

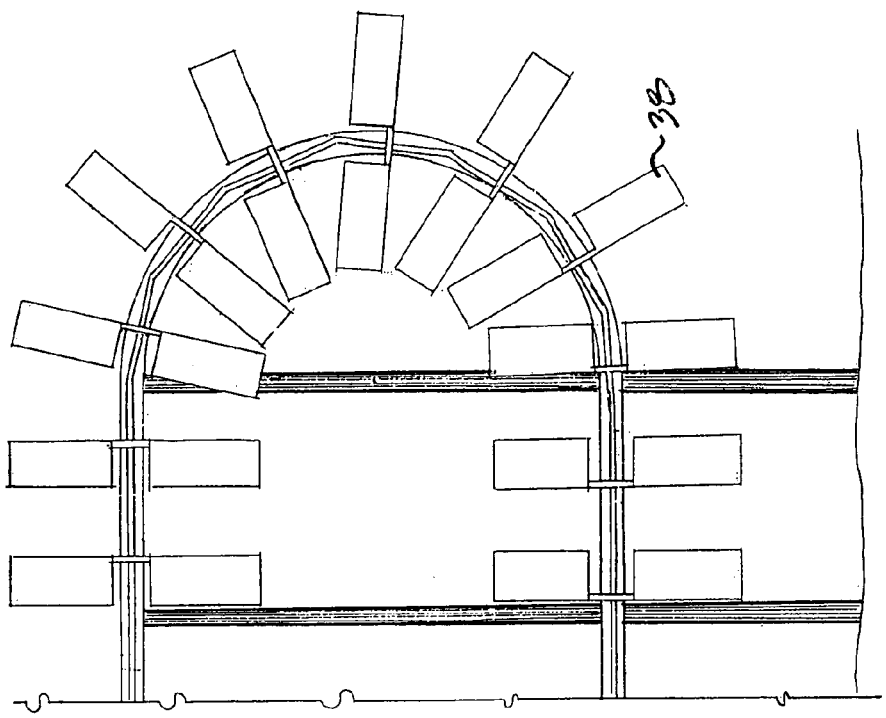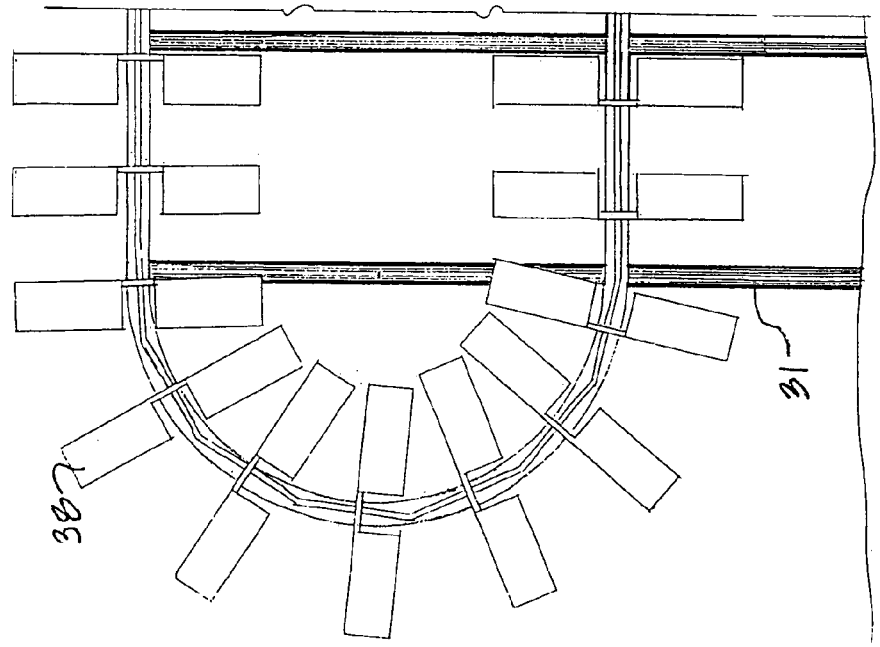
FIG. 9

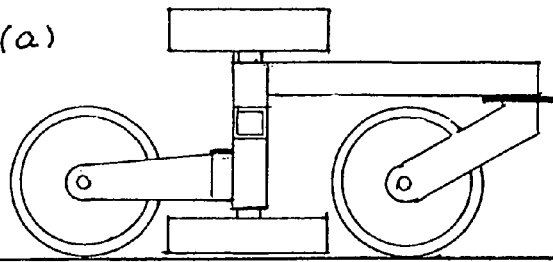
TANDEM WHEELS
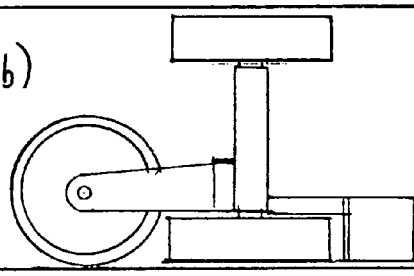
SIDE VIEW SCRAPER
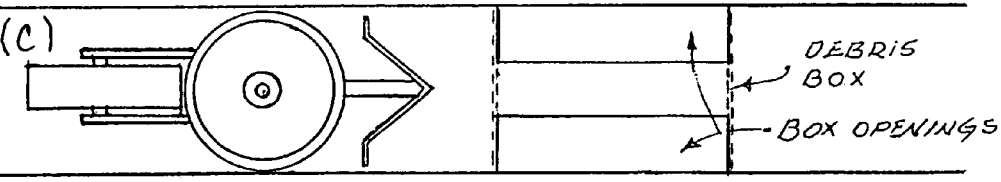
TOP VIEW SCRAPER
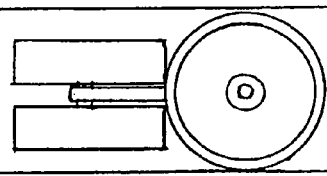
DUAL WHEELS
FIG. 17

WIND AND WATER POWER GENERATION DEVICE USING A RAIL SYSTEM

RELATED APPLICATIONS

This application claims priority from U.S. Provisional Application No. 60/215,794, filed on Jul. 5, 2000.

THE FIELD OF THE INVENTION

The present invention relates to a power generation assembly for use in generating electrical power from air or water currents, and more particularly to a rail-based conveyance system having a low-mass car assembly.

BACKGROUND OF THE INVENTION

For thousands of years, wind and water have been harnessed as sources of power. In Europe and Asia, for example, wind was a primary source of energy for thousands of years. More recently, much of the world's energy has been derived from fossil fuels. Because more energy could be more efficiently obtained from fossil fuels, they largely supplanted the use of wind and water as power sources. However, in a day where pollution, rising energy costs and depleting resources are among the chief concerns, harnessing water and wind as forms of energy is becoming more economically feasible and more desirable.

Examples of systems adapted for harnessing the energy of wind and water are disclosed in the following patents, which are hereby incorporated by reference for their supporting teachings:

U.S. Pat. No. 3,730,643 to Davison discloses wind power machine in which a plurality of sails connected to an endless chain move about an endless horizontal track to drive an electric generator. Each sail is mounted on an individual truck supported on the track. The endless track is arranged as two spaced apart parallel runs connected by semi-circular end sections. Each sail is rotatable about a vertical pivot on its truck and is controllable so that the sails can be positioned to drive the machine while moving along one run of the track and to be positioned to offer the least wind resistance while moving in the reverse direction along the other run of the track. Depending upon the direction of the wind the sails in most instances can be adjusted to provide drive along both runs of the track. The sails are adjusted by an electric motor drive controlled by a wind vane. In a modified control system an anemometer is provided to over ride the wind vane control, to align the sails with the wind to present the least resistance to the wind when the wind power machine is subjected to winds of damaging force.

U.S. Pat. No. 4,163,905 to Davison discloses a submerged water power machine in which a plurality of vertical blades are connected to two endless chains, one located at the top ends and the other located at the bottom ends of the blades. The blades drive the chains about two endless horizontal tracks, and the chains are drivingly coupled to electric generators. Each blade is mounted on an individual truck supported on the top track and is guided at its bottom by a roller within the bottom track. The endless tracks are arranged as two spaced-apart parallel runs connected by semi-circular end sections. Each blade is adjustable about vertical pivot means on its truck and is controllable so that the blades can be positioned to drive the machine while moving along both runs of the tracks. The blades are adjusted either by electric servo motor drive means controlled by a position programmer or by followers carried by the blades and engaging cam tracks. The trucks, top chain and blade-positioning control elements are contained in a pressurized inverted cup-hole housing so that these parts operate in air rather than water. Over this housing is a flotation air compartment containing the generators. Tether lines are employed to anchor the machine to the ocean floor. The blades are spaced far enough apart to allow a portion of the water to flow past the first row of blades into the path of the second row of blades, with the blades of both rows oriented to develop driving force on the chains in the same direction of chain travel.

U.S. Pat. No. 4,589,344 to Davison discloses a novel wind or water powered generator apparatus is provided for generating substantial quantities of electricity. The apparatus includes a plurality of sail-driven cars connected to form a continuous chain and suspended from a monorail loop. The car suspension system has two horizontal guide wheels and one vertical carrier wheel. Substantially the entire weight of each car is carried by its vertical wheel, which is located near the car's center of gravity. Further, all three suspension wheels are located inside the monorail, thereby rendering car derailment virtually impossible. Two sails are attached to each car, one being directed upwardly and the other being directed downwardly. The surface areas of the two sails are such that the average, total current force on each sail is approximately the same. Additionally, the novel sails are free to rotate 360 degrees about their support poles, but they are biased to a preferred orientation. Thus, as the current and biasing forces interact, the cars are propelled along the monorail. Importantly, in the event that destructive strength currents arise, the sails rapidly align themselves with the current, thereby preventing sail destruction. One or more elongated augers are positioned adjacent the monorail loop. Auger drive rollers are attached to each car such that the adjacently moving cars rotate the auger. A generator is connected to the augers so as to be driven thereby.

While the foregoing prior art references demonstrate improvement in the field of power generation, each of these prior art references have proven inadequate in several respects. First, in a monorail loop generation system, it is advantageous to minimize the mass of the vane/car assembly. If these assemblies have large mass, much of the wind's energy is being utilized in overcoming friction between the assemblies and the rail. In contrast, if the vane/car assembly has relatively small mass, it can be more readily moved by the wind. This movement may then be used to generate energy.

Additional concerns related to the mass of the vane/car assemblies are expense of materials. For obvious reasons, the more materials that are required in constructing a power generation system, the more uneconomical the system becomes.

Accordingly, it would be advantageous to have a power generation system that reduced the overall mass of the vane/car assembly, while providing the environmental and economical advantages of wind and water as sources of energy.

SUMMARY OF THE INVENTION

There is, therefore, provided a power generation assembly for use in generating electrical power from air or water currents, and more particularly to a rail-based conveyance system having a low-mass car assembly. The assembly includes the following features. First, a rail system is provided. Slidably mounted on the rail is a car assembly. The car assembly includes a linkage portion that couples the car to a vane assembly. The vane assembly includes a frame, to which the linkage portion is connected, and at least one vane. A power-take-off device is pivotally coupled to the car. The power-take-off device engages generator drive wheels, which are coupled to a generator, thereby driving the generator.

In one embodiment, the power-take-off connects adjacent car assemblies. This connection can be accomplished in any number of ways, however in one particular embodiment, the power-take-off device comprises an element running between two guide wheels. In another embodiment, the power-take-off device is coupled to the linkage portion of the car. Tongue-and-groove couplings at the ends of the power take-off device may be used to connect the car assemblies.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

BRIEF DESCRIPTION OF THE DRAWINGS

FIG. 9 is a front view of a vertical monorail assembly.

FIGS. 17(a)–(d) are various car assembly configurations according to the present invention.

DETAILED DESCRIPTION OF THE PREFERRED EMBODIMENT(S)

The presently preferred embodiments of the invention will be best understood by reference to the drawings, wherein like parts are designated with like numerals throughout.

Figure 1:
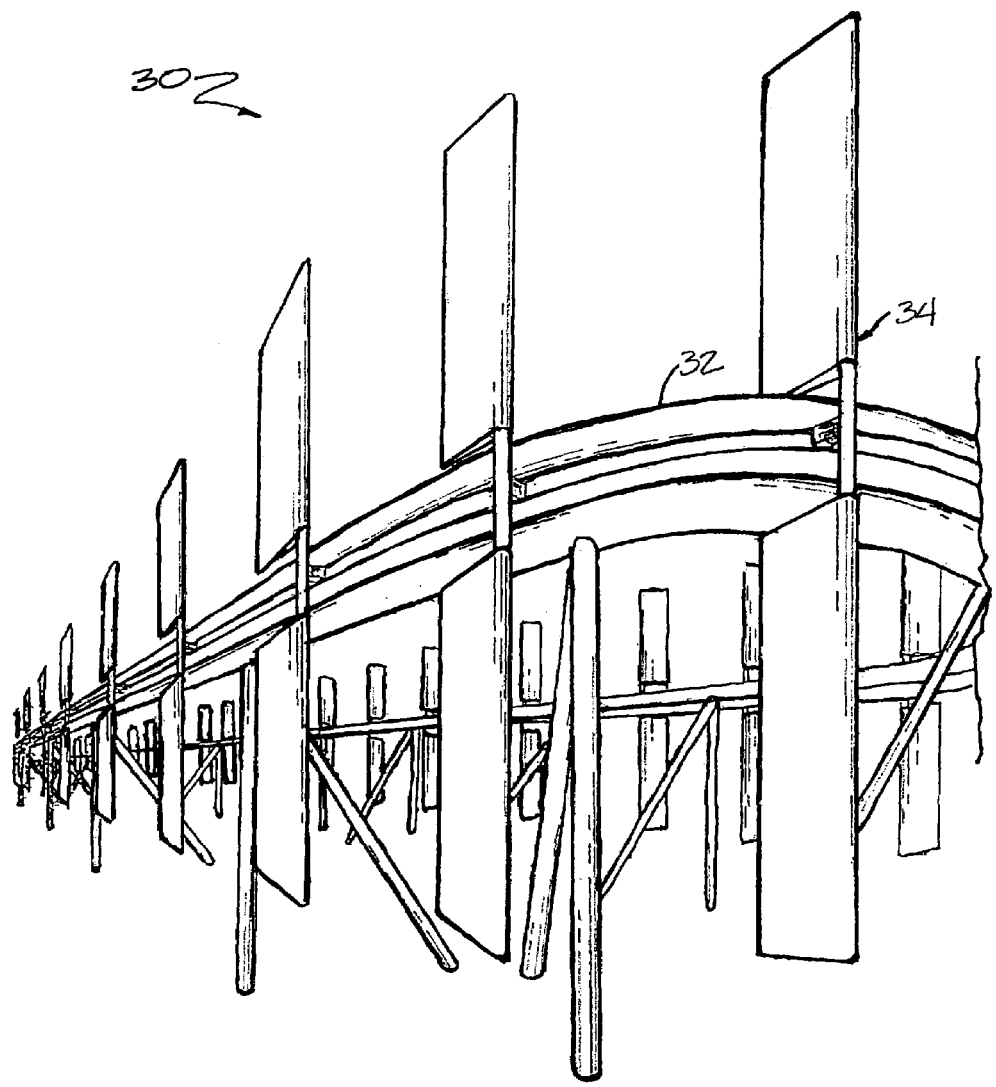
FIG. 1 is a perspective of a power generation assembly according to the present invention.
Figure 2:
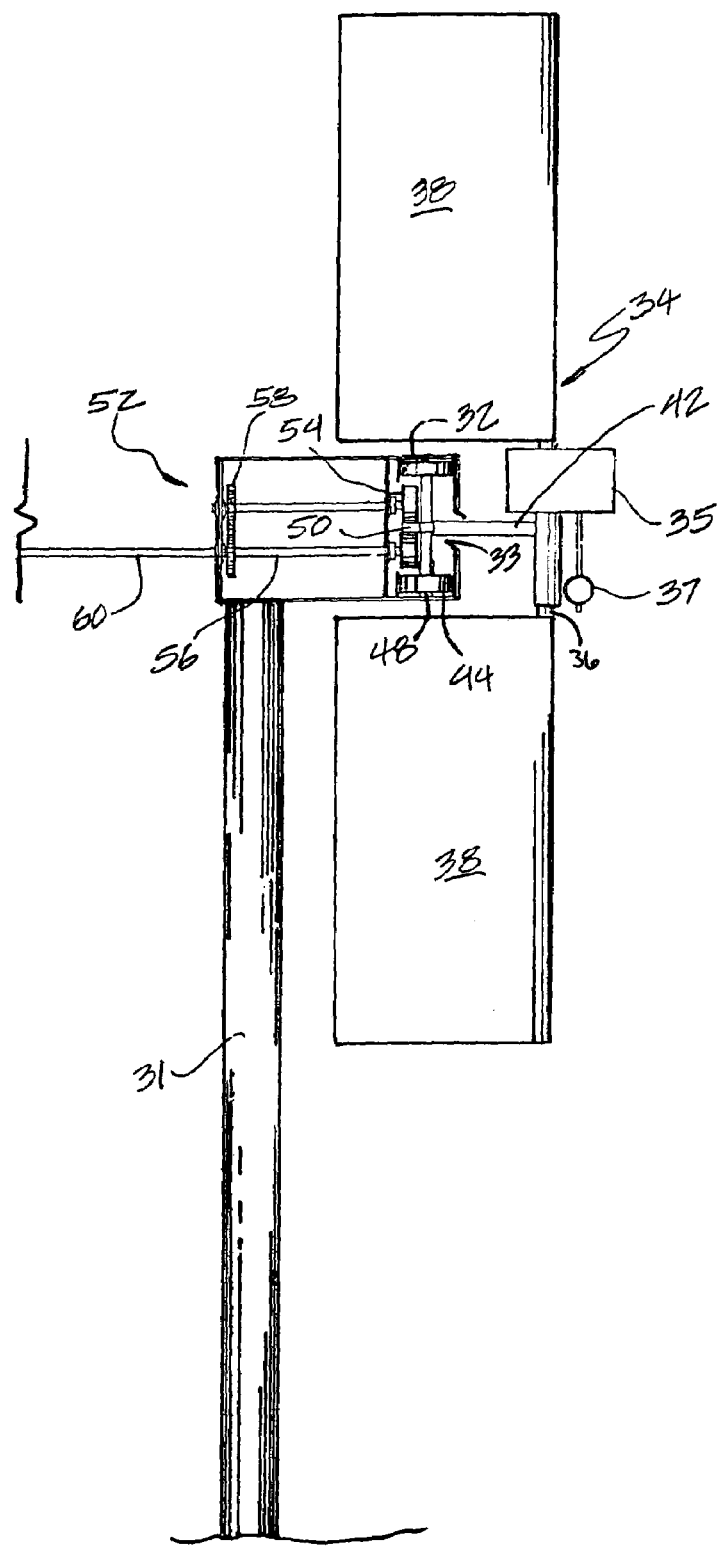
FIG. 2 is a side-sectional view of a power generation assembly according to the present invention.

In FIGS. 1 and 2, a power generation assembly 30 is shown. The power generation assembly includes a rail 32, which in FIGS. 1 and 2, is a monorail supported by pole supports 31. In FIG. 1, numerous vane assemblies 34 are shown slidably mounted on the rail 32. However, it is noted that the actual number of vane assemblies 34 used in each power generation assembly 32 may vary depending on need.

The vane assembly 34 consists of a frame 36 and at least one vane 38 positioned on the frame 36. FIGS. 1 and 2, show both upwardly and downwardly deployed sails 38. The sails 38 are coupled to a common shaft 39 pivotal in a sleeve bearing 43 (FIG. 4), and are biased to one side so as to eliminate side to side movement within the rail 32. This biasing also keeps the guide wheels 44 turning in the same direction more of the time. A pin release cover 35 and pendulum 37 are shown proximate the frame 36, and the frame 36 is coupled to a car assembly 40 by a linkage portion 42.

Figure 3:
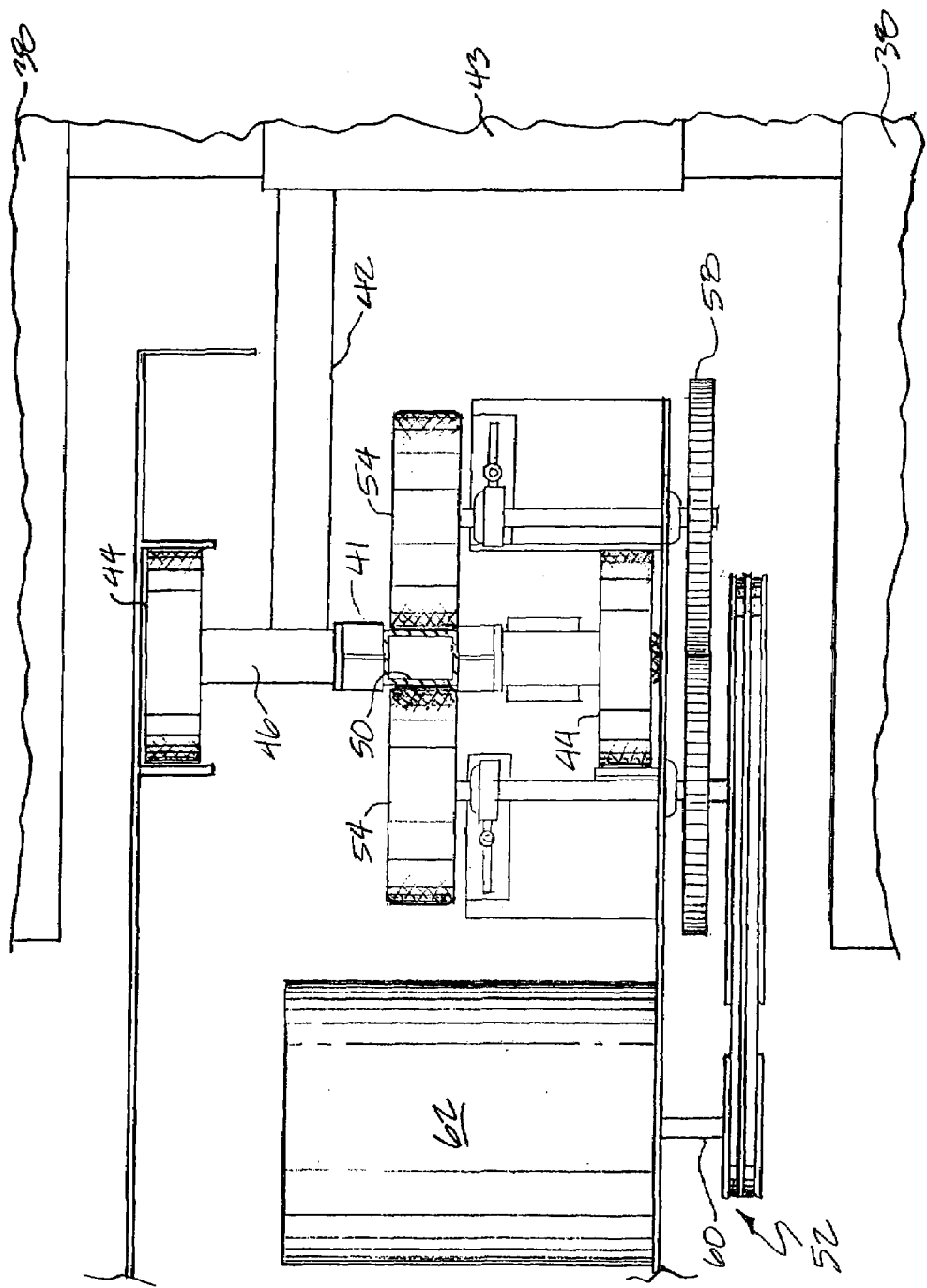
FIG. 3 is a side-sectional view of a car assembly and generator system.
Figure 4:
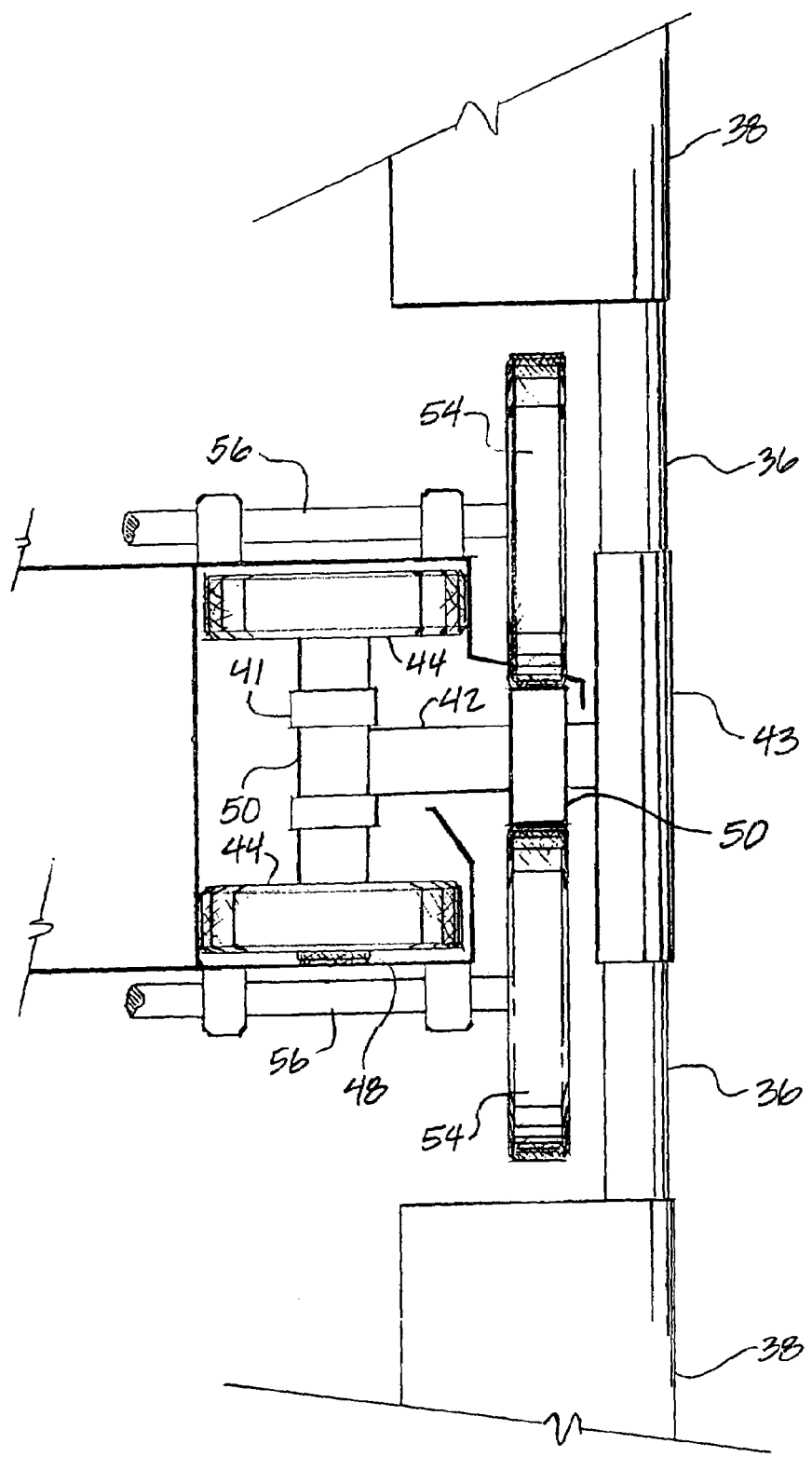
FIG. 4 is a side-sectional view of another embodiment of the car assembly and generator system.

FIGS. 3 and 4 show car assembly 40 embodiments in greater detail. In addition to the linkage portion 42, the car assembly 40 includes a carrier wheel 48 at least two guide wheels 44 coupled along a longitudinal axis element 46. As seen in FIGS. 3 and 4, a sleeve bearing 41 allows a power-take-off device 50 to pivot around the longitudinal axis element 46. The power-take-off device 50 is the means whereby adjacent car assemblies 40, along the power generation system 30, are interconnected. The power-take-off device 50 is also the mechanism that engages the drive wheels 54, whereby a generator 62 is driven.

In operation, the present power generation assembly 30 is placed in the path of a wind or water current. In the wind-driven assembly, airfoils 38 are coupled to a car assembly 40 that is slidably mounted along the rail 32. In response to wind currents, the car assembly 40 travels along the rail 32. As the car assembly 40 travels, the power-take-off device 50 passes through a pair of adjustable drive wheels 54. These drive wheels 54 may be compressed by adjustment and/or springs placed above and below the power-take-off device 50.

The power-take-off 50 may be composed of, or coated with, a suitable traction material. As the power-take-off 50 passes through the drive wheels 54, the drive wheels 54 are engaged, and thus begin rotating. This rotational energy is then transferred along an axle 56, which can then be used, through a series of gears 58, to power a generator drive shaft 60.

It is noted that the power-take-off device 50 can be coupled to the car assembly 40 in any number of configurations. For example, in FIG. 3, the power-take-off device 50 is coupled to the longitudinal axis element 46. In contrast, in FIG. 4, the power-take-off device is coupled to the linkage portion 42. However, in each instance, the generator 62 is driven by the passage of the power-take-off device 50 through the drive wheels 54.

Figure 5:
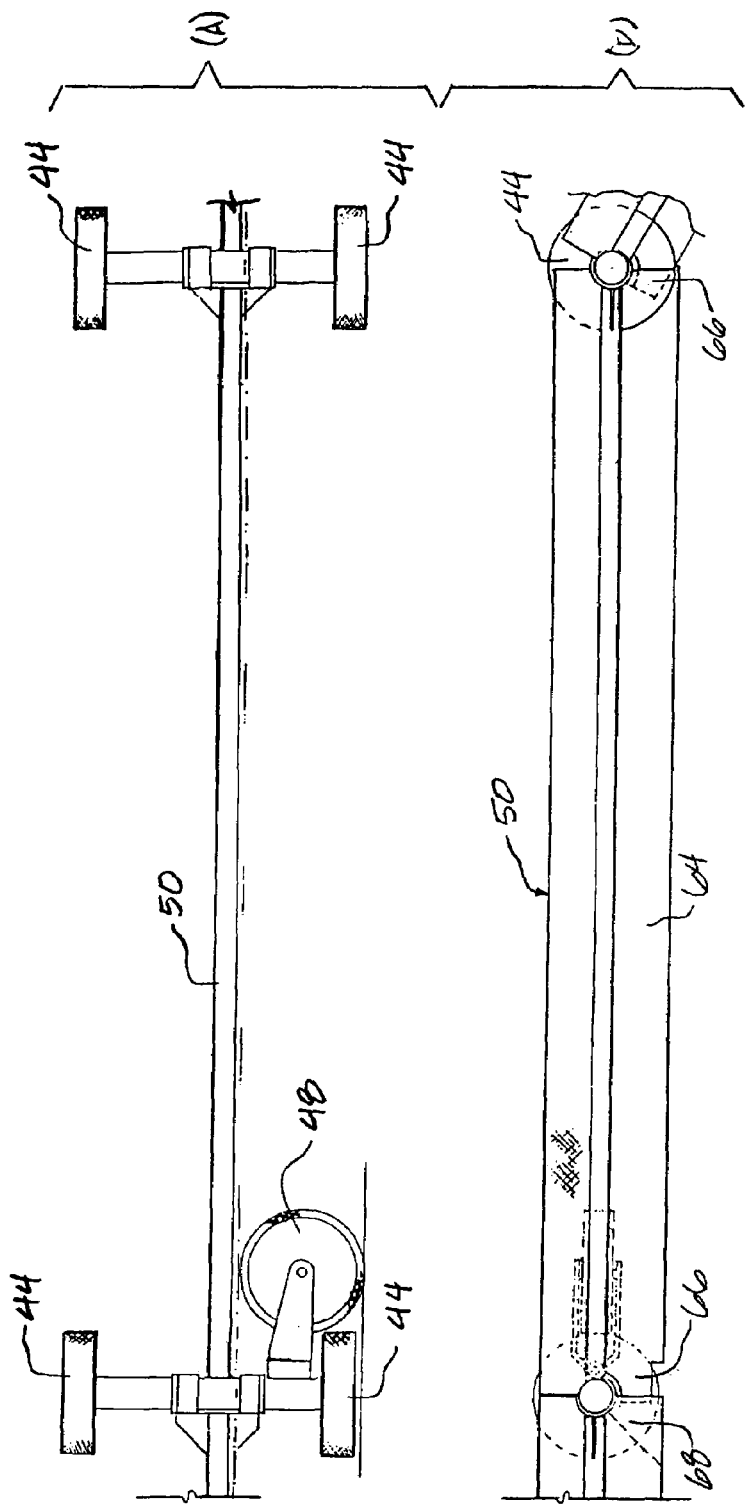
FIGS. 5(a) and (b) are a side and top view, respectively, of a car assembly.
Figure 6:
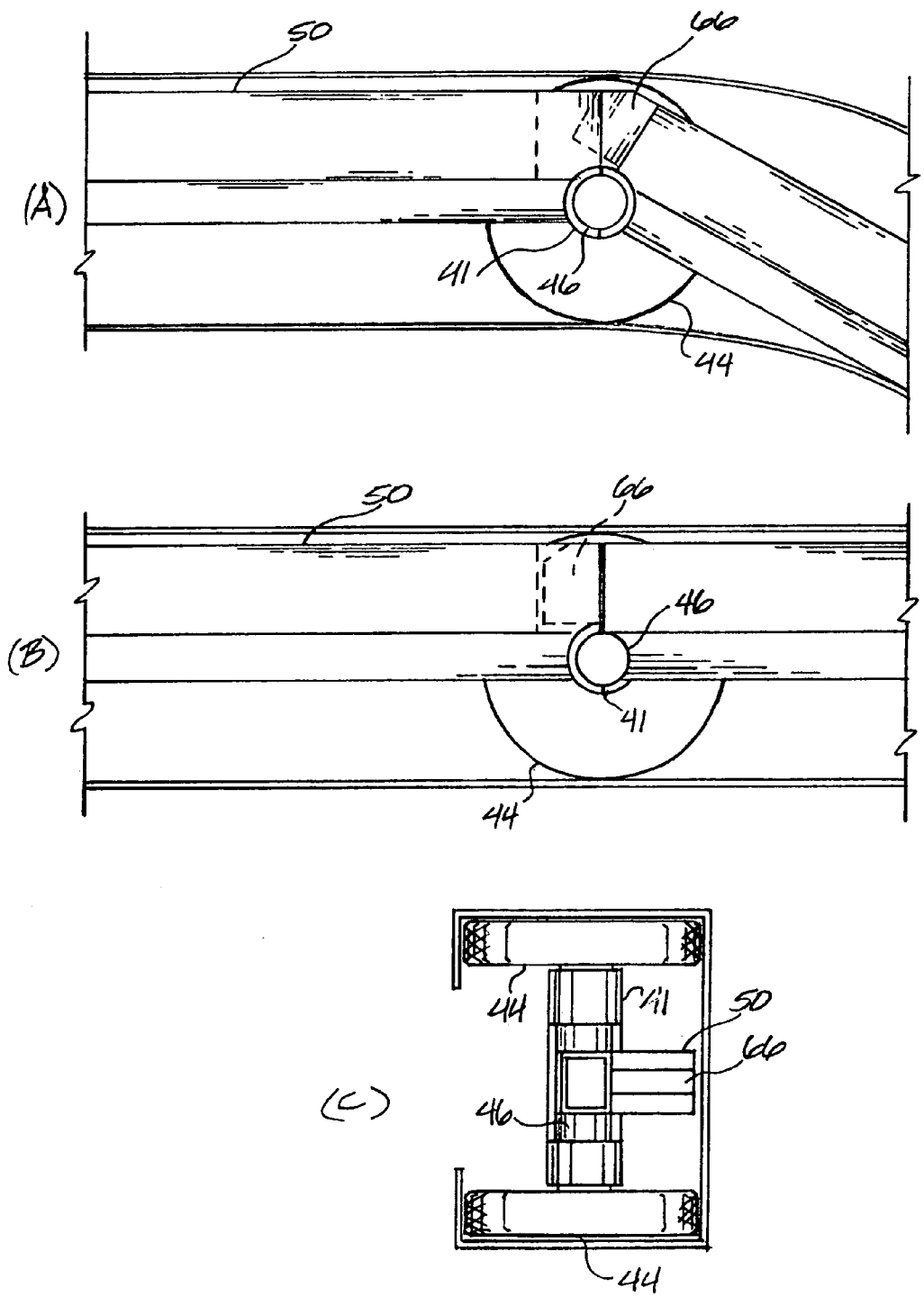
FIGS. 6(a) and (b) are a top view of a tongue-and-groove connection according to the present invention.
FIG. 6(c) is a side-sectional view of an embodiment of a power-take-off as coupled to the car assembly.

FIGS. 5 and 6 show in greater detail the pivoting connection between adjacent car assemblies 40. This pivoting action is particularly important when the rail 32 is configured as a loop. In FIG. 5(a) a side view of two adjacent car assemblies 40 is shown. The car assemblies 40 are connected along a power-take-off device 50. The power-take-off device 50 partially, or wholly, circumscribes the sleeve bearing 41 along the longitudinal axis element 46. A slot shield 64 is also shown in FIG. 5(b). By pivotally hinging each adjacent car assembly 40 in this manner, all moving parts of the power generation assembly 30 can be substantially enclosed, providing protection against environmental elements that could otherwise damage the assembly.

As best seen in FIGS. 6(a) and (b), a tongue 66 and groove 68 connection is placed at each car assembly 40. FIG. 6(a) shows the power-take-off device 50 as the car assembly 40 rounds a bend in the rail 32. FIG. 6(b) shows the power-take-off device 50 on a substantially straight portion of the rail 32.

Figure 7:
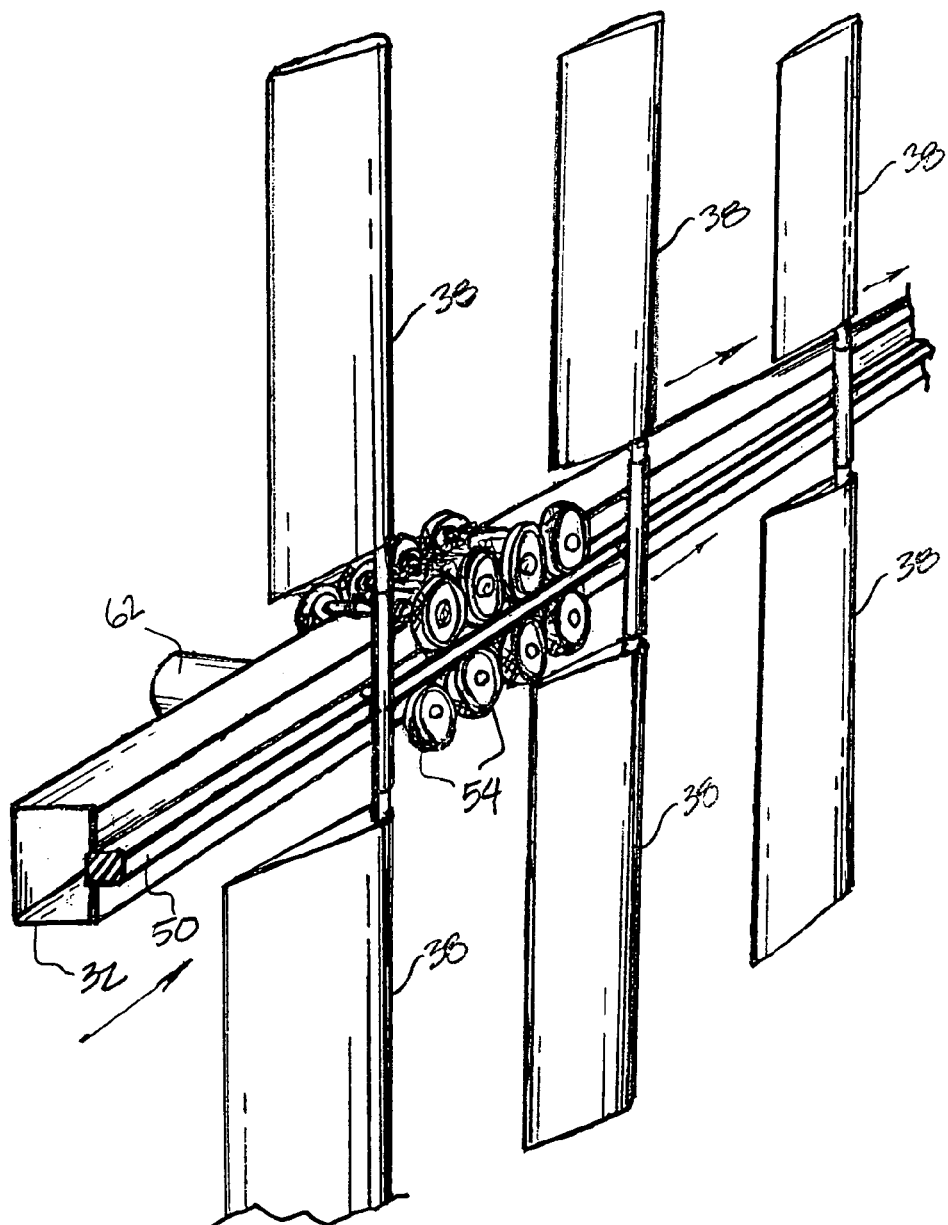
FIG. 7 is a side-view of an embodiment of a generator system

FIG. 7 depicts a drive wheel 54 configuration according to the present invention. It is noted that while eight pairs of drive wheels 54 are shown, any number of drive wheels 54 could be so configured.

Figure 8:
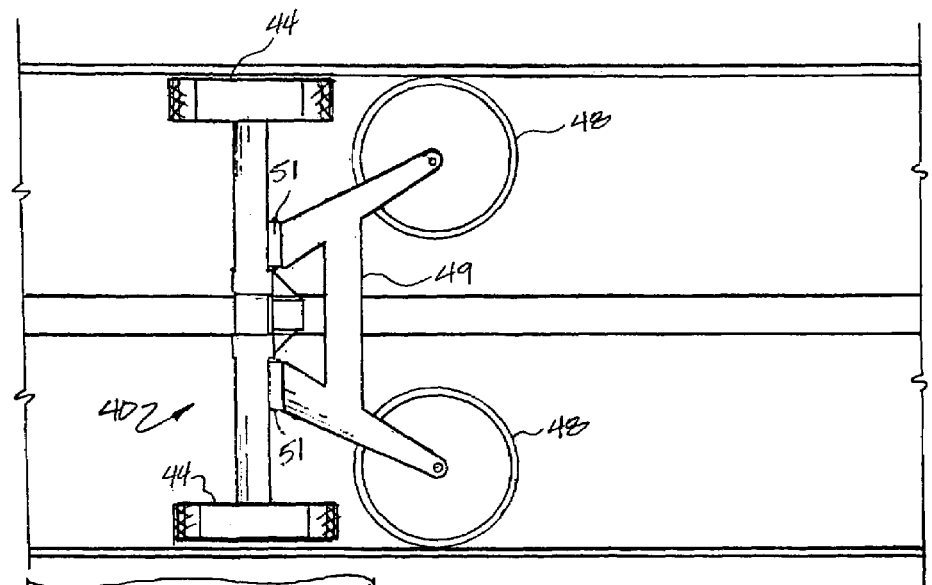
FIGS. 8(a) and (b) are side and top views, respectively, of a car assembly embodiment according to the present invention.
Figure 8:
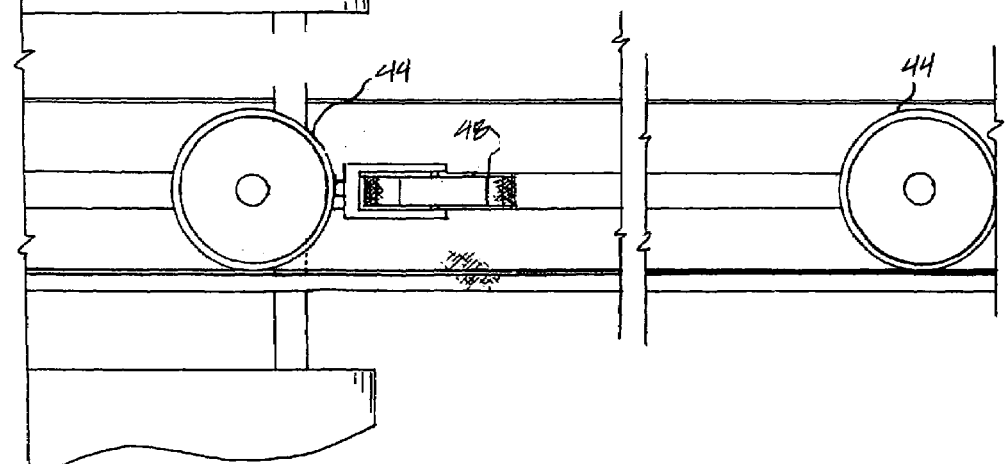

FIGS. 8(a)–(b) and FIG. 9 show rail configuration and car assembly configurations for a vertical monorail system. It is noted that in FIGS. 8(a) and (b), more than one carrier wheel 48 is utilized. These carrier wheels 48 are supported by a brace 49 that is coupled to the longitudinal axis element 46 with two bearings 51.

Figure 10:
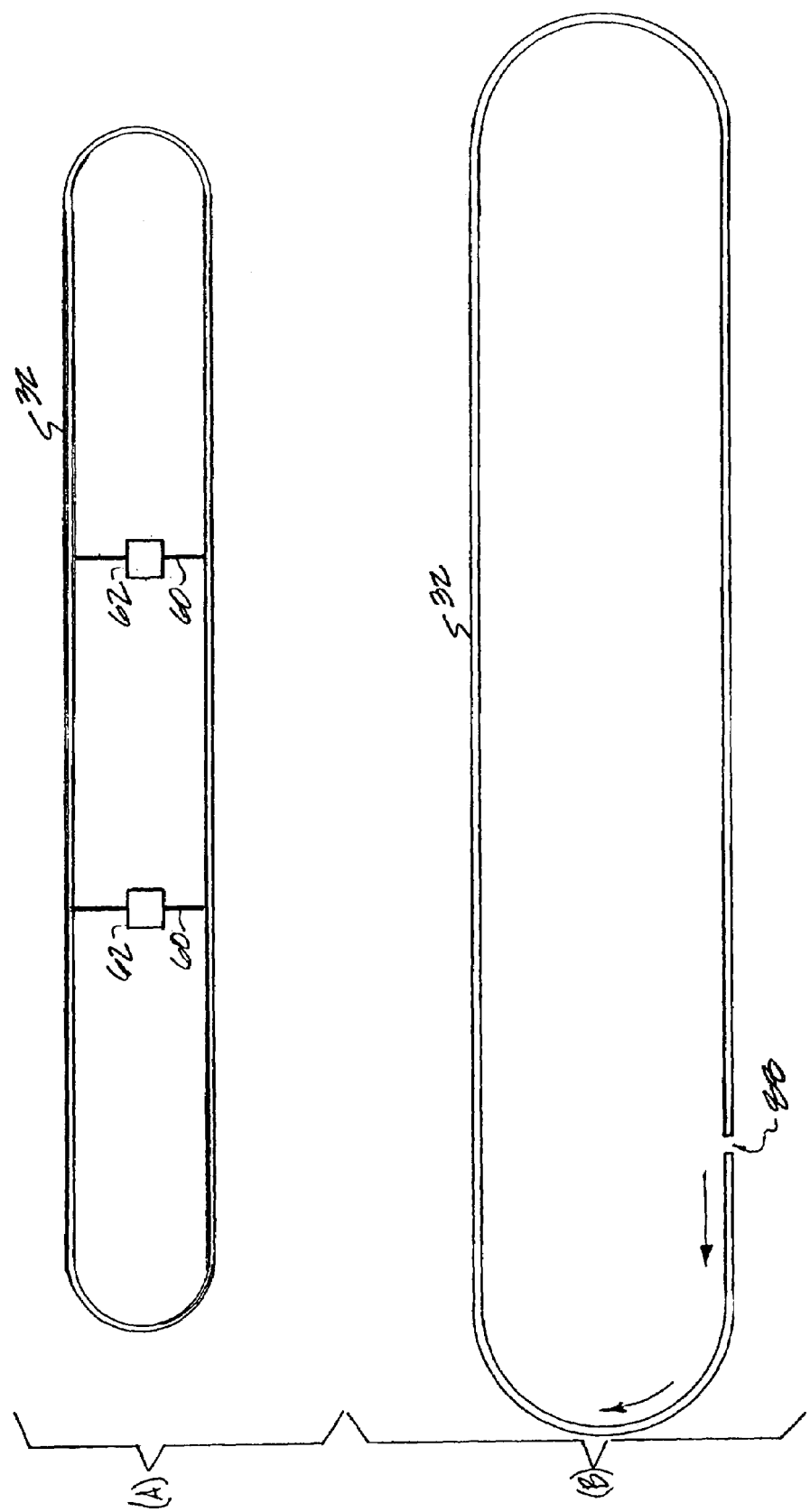
FIGS. 10(a) and (b) show embodiments of the rail configuration according to the present invention.

FIG. 10(a) shows an oval loop rail design wherein a common generator 62 is driven by multiple drive shafts 60. In this configuration, drive wheels 54 are engaged in the same manner as outlined above. However, by utilizing a common generator 62, greater energy can be harnessed without requiring additional generators 62. It is also noted that the loop configuration is advantageous because efficiency increases in proportion to length. Thus, a long narrow looping rail system will be more efficient than other rail designs.

FIG. 10(b) shows an oval rail loop with an open segment 88. Such an open segment 88 is advantageous in construction of the power generation assembly 30 because it allows insertion of the vane/car assemblies from one location. Once the vane/car assemblies are all inserted, the power generation assembly could commence operation by inserting a compatible segment of rail 32, such as a panel or door, thereby closing the loop. Such a panel or door would be advantageous for maintenance and repair of vane/car assemblies. It is also noted that, upon completion of construction, this open segment 88 would be an advantageous location to remove the vane/car assemblies for replacement.

Figure 11:
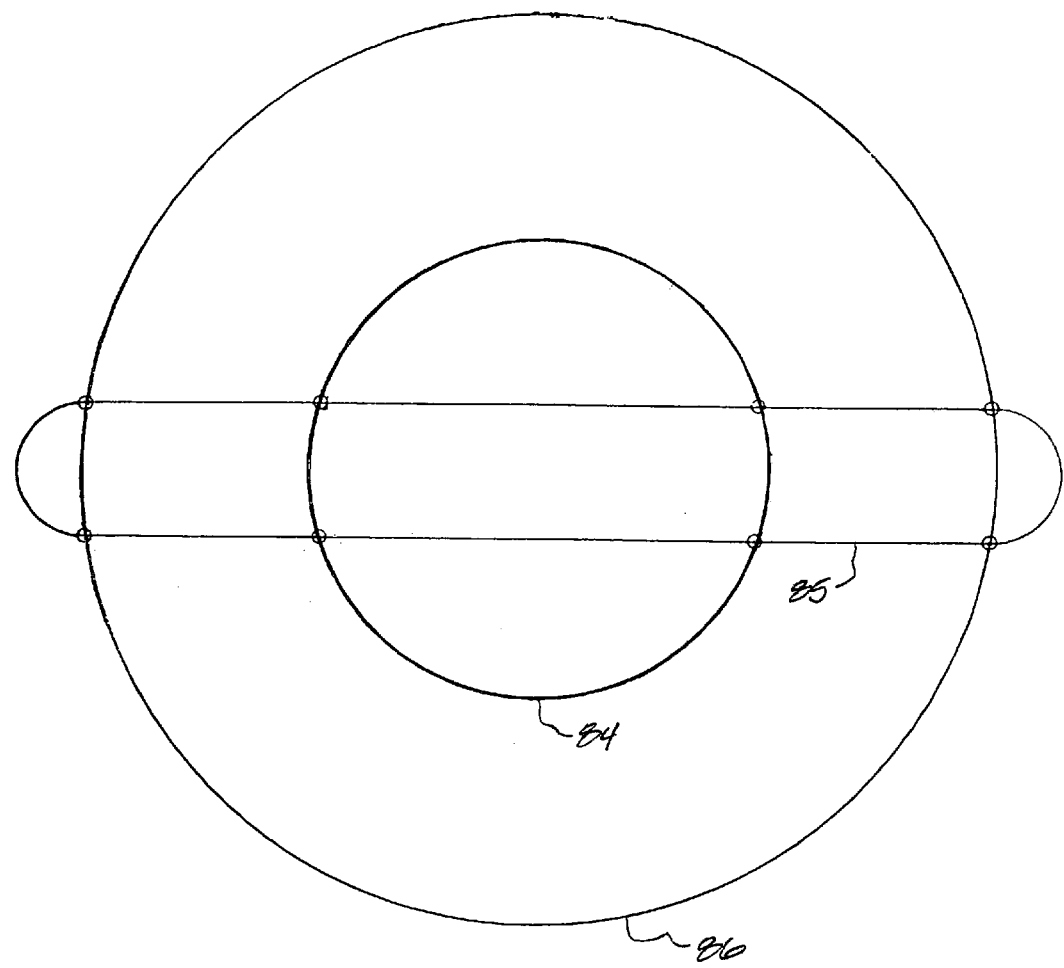
FIG. 11 shows an adjustable looping rail system.

FIG. 11 depicts another embodiment respecting rail configuration. This configuration is well suited for areas having winds from all directions. In this figure, a parallel loop rail 85 is mounted upon an inner circle track 84 and an outer circle track 86. Thus, the parallel loop 85 can be positioned along the inner 84 and outer tracks 86 for better orientation to the wind.

Figure 12:
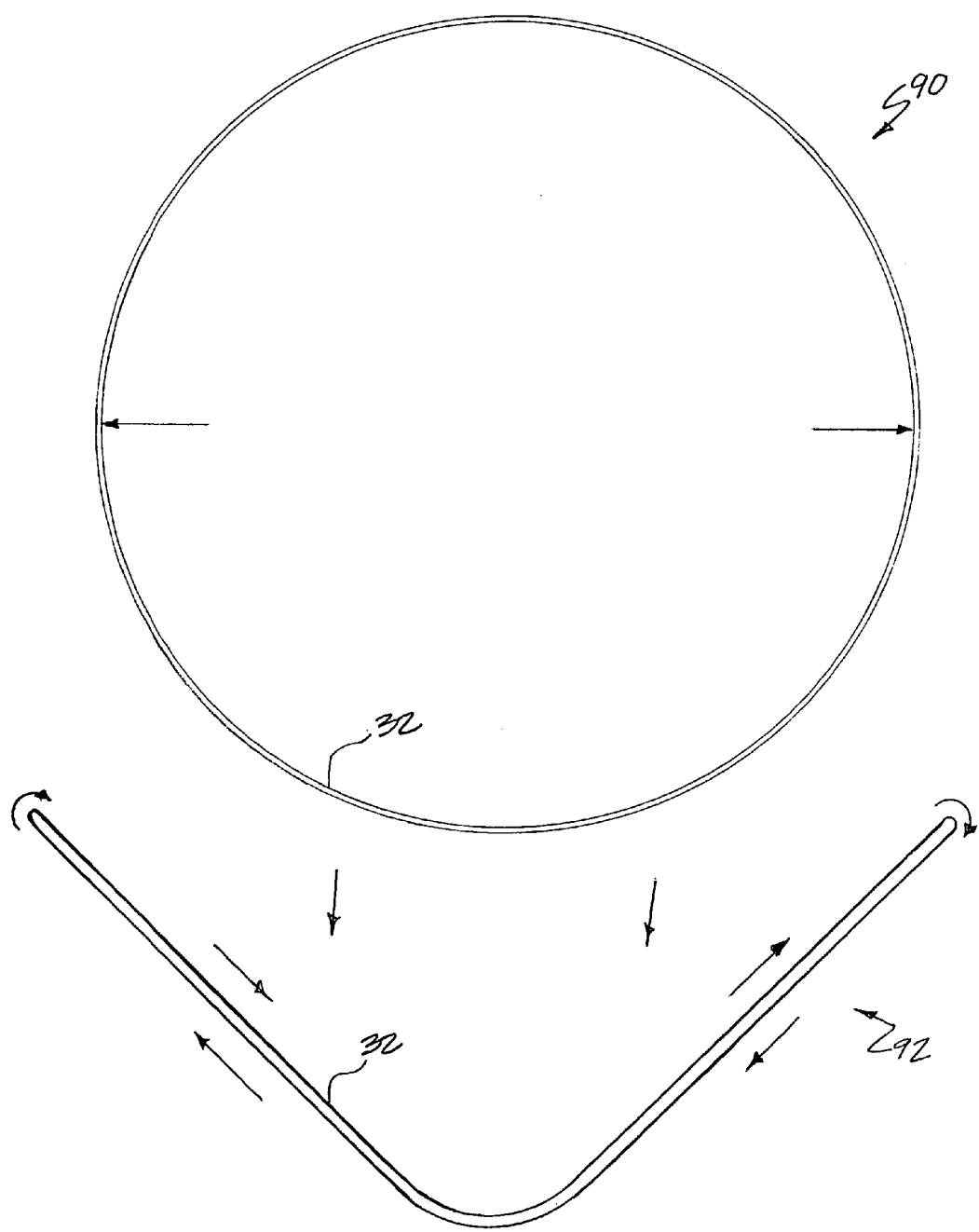
FIG. 12 is an embodiment of a rail configuration according to the present invention.
Figure 13:
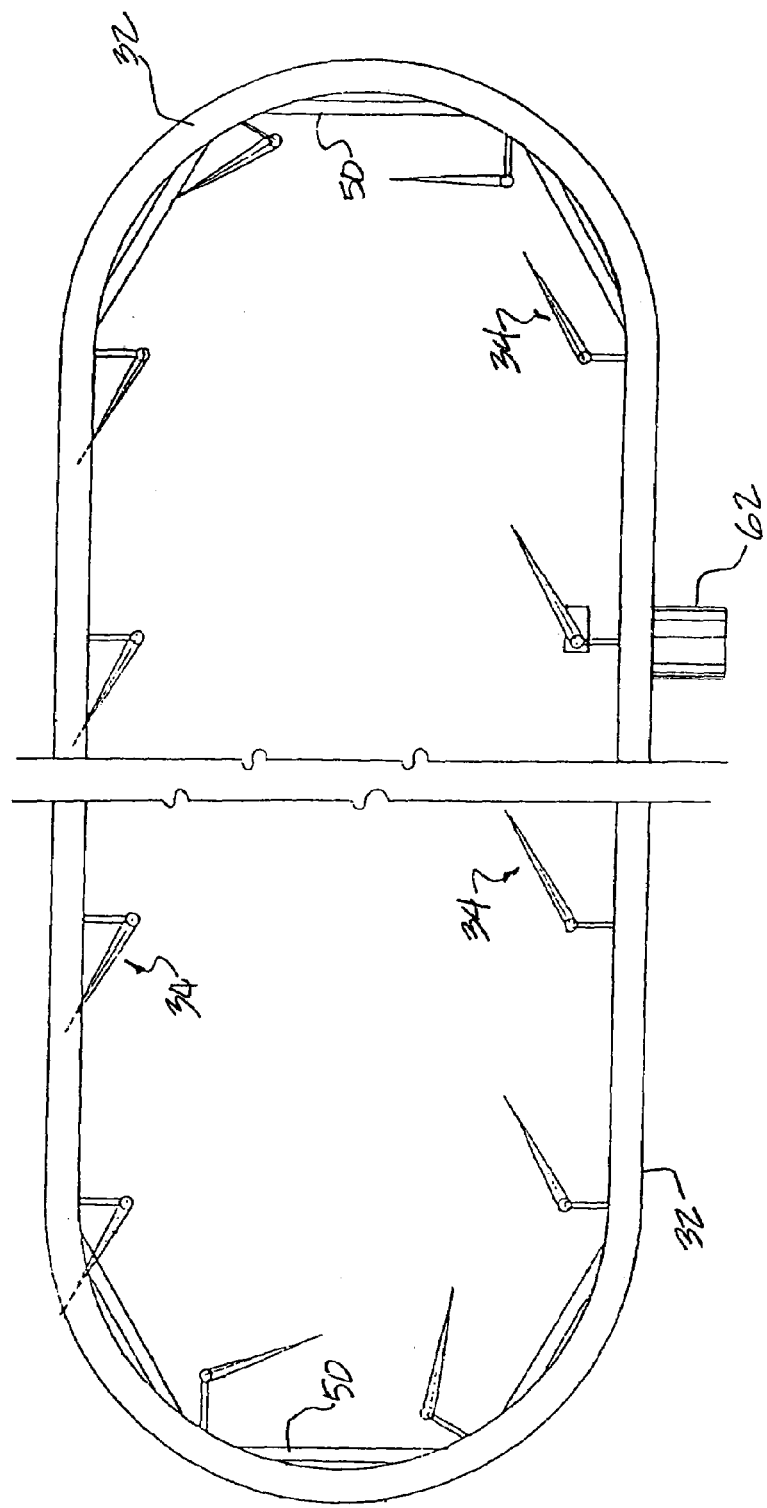
FIG. 13 is a top plan view of a power generation assembly.

FIG. 12 depicts two other rail configurations. With the circular configured rail 90, the rails 32 have large spaces between them. Such large separating spaces between the rails 32 enables the wind to recoup with full force on the leeward side. The L-configured rail 92 enhances the power generating assemblies 30 ability to extract more energy from the wind due to cascade effect (i.e. the wind is partially dammed thereby increasing the pressure gradient).

Figure 14:
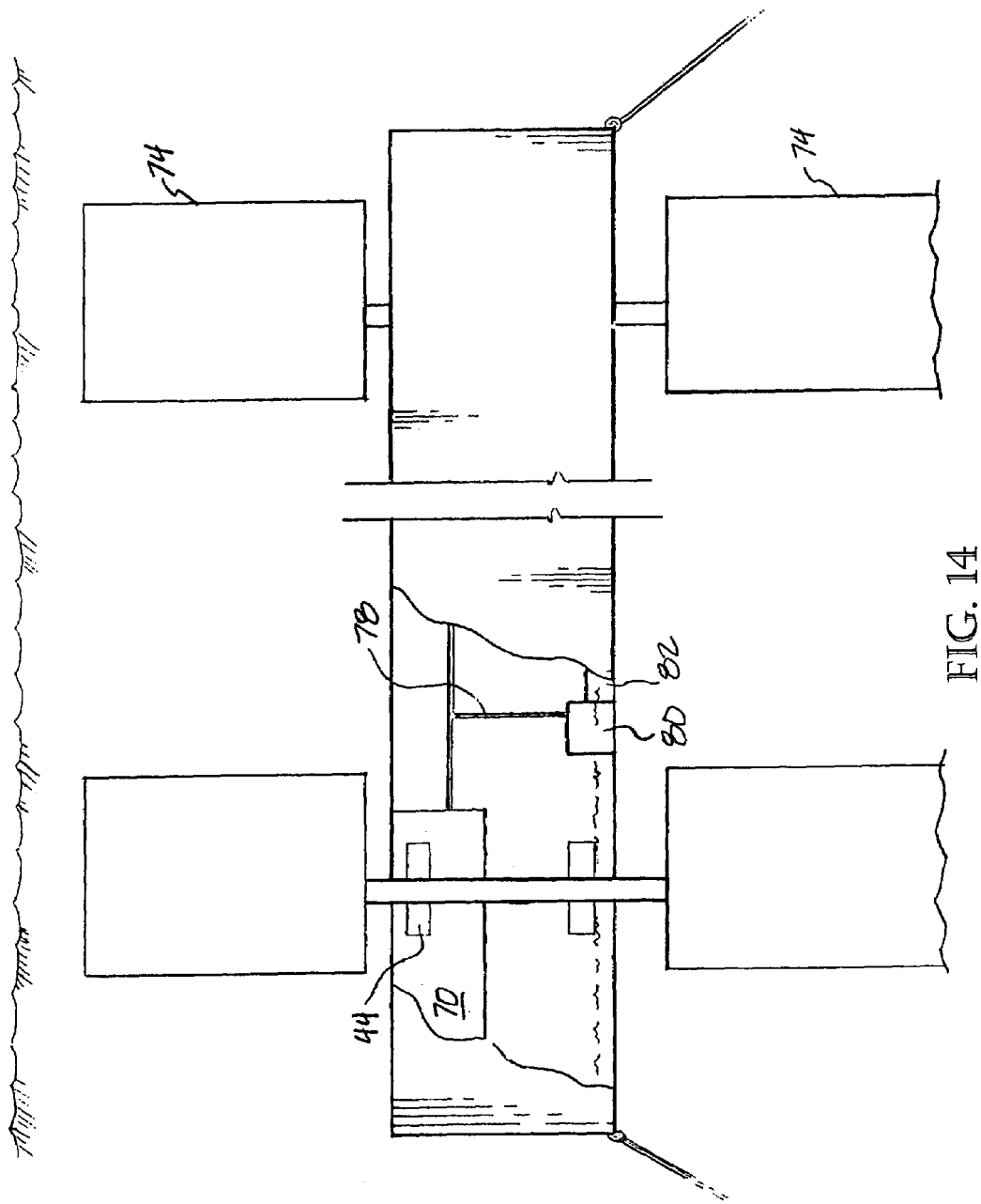
FIG. 14 is a side-sectional view of a submersible embodiment of the present power generation assembly.
Figure 15:
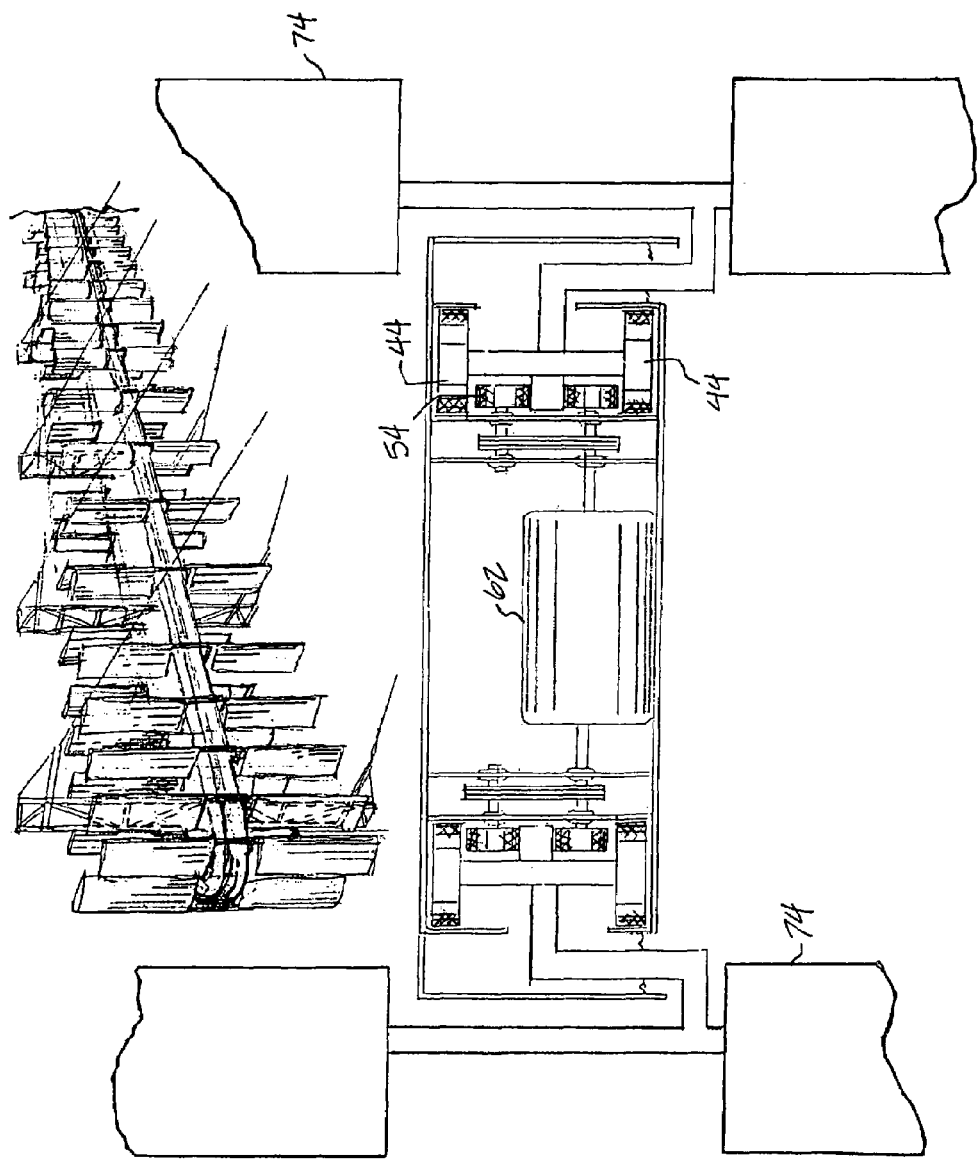
FIG. 15 is a cross-sectional view of a submersible embodiment of the present power generation assembly.
Figure 16:
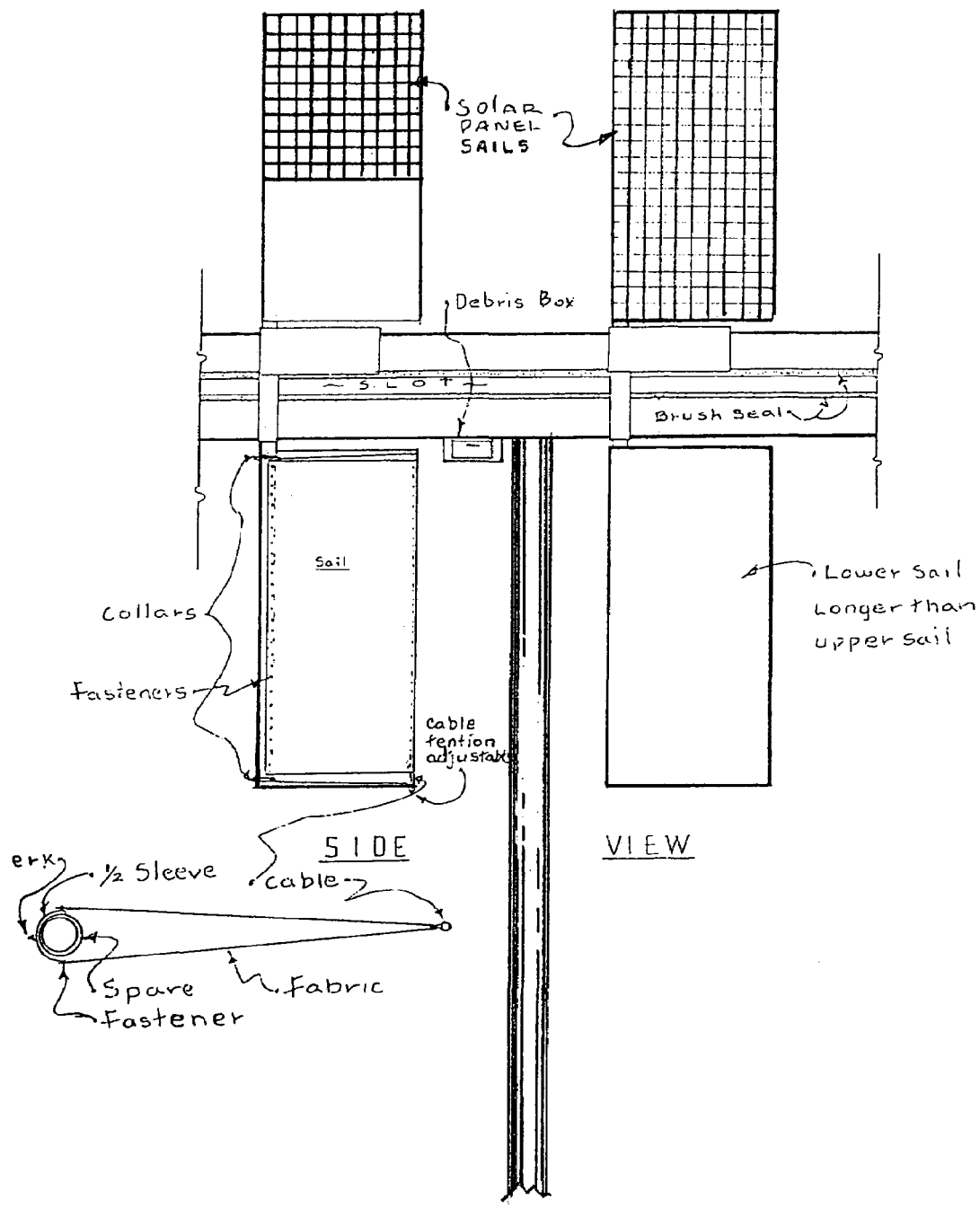
FIG. 16 side view of an airfoil assembly including solar panels.
Figure 18:
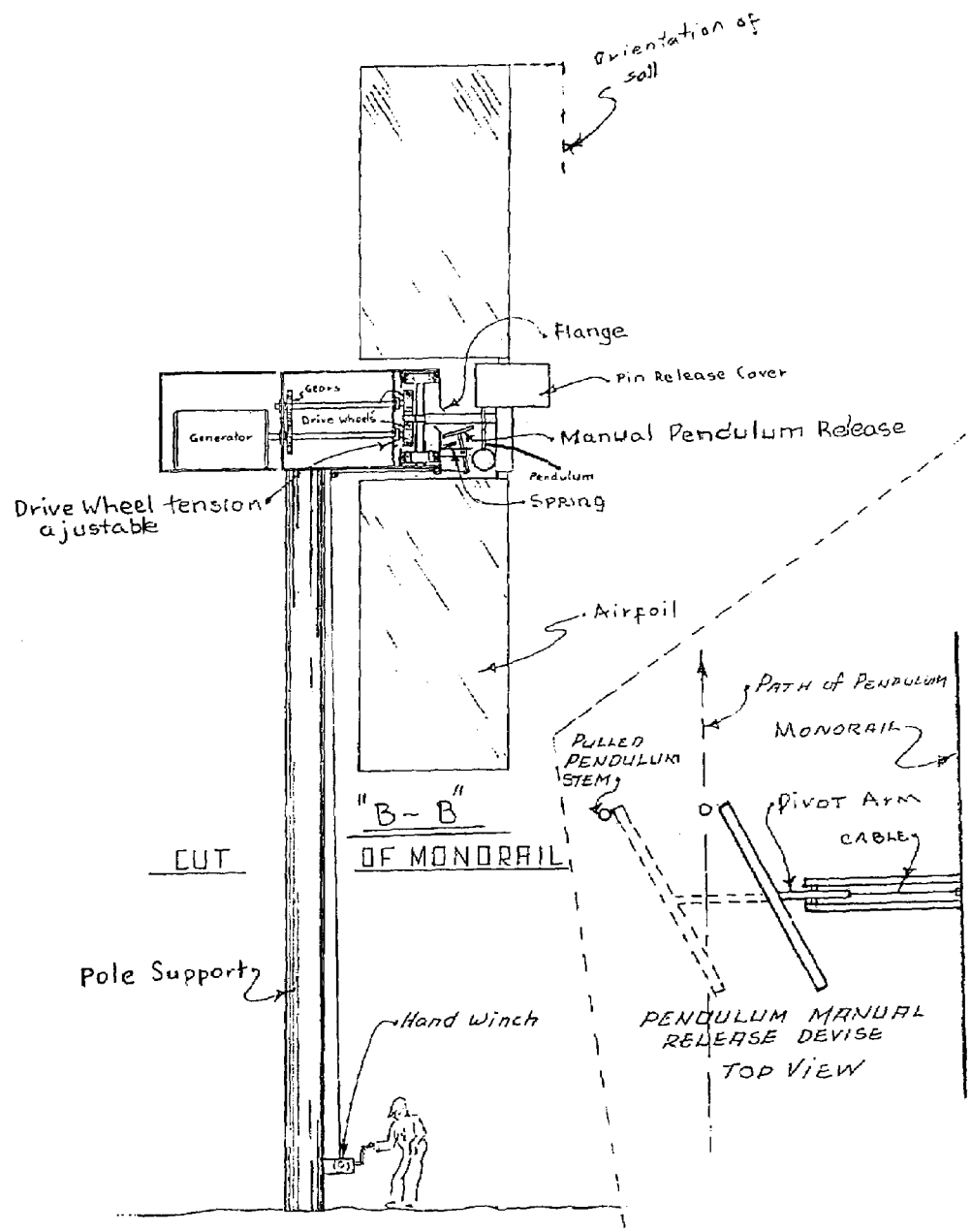
FIG. 18 is a side section of a power generation assembly showing a pendulum feathering device.
Figure 19:
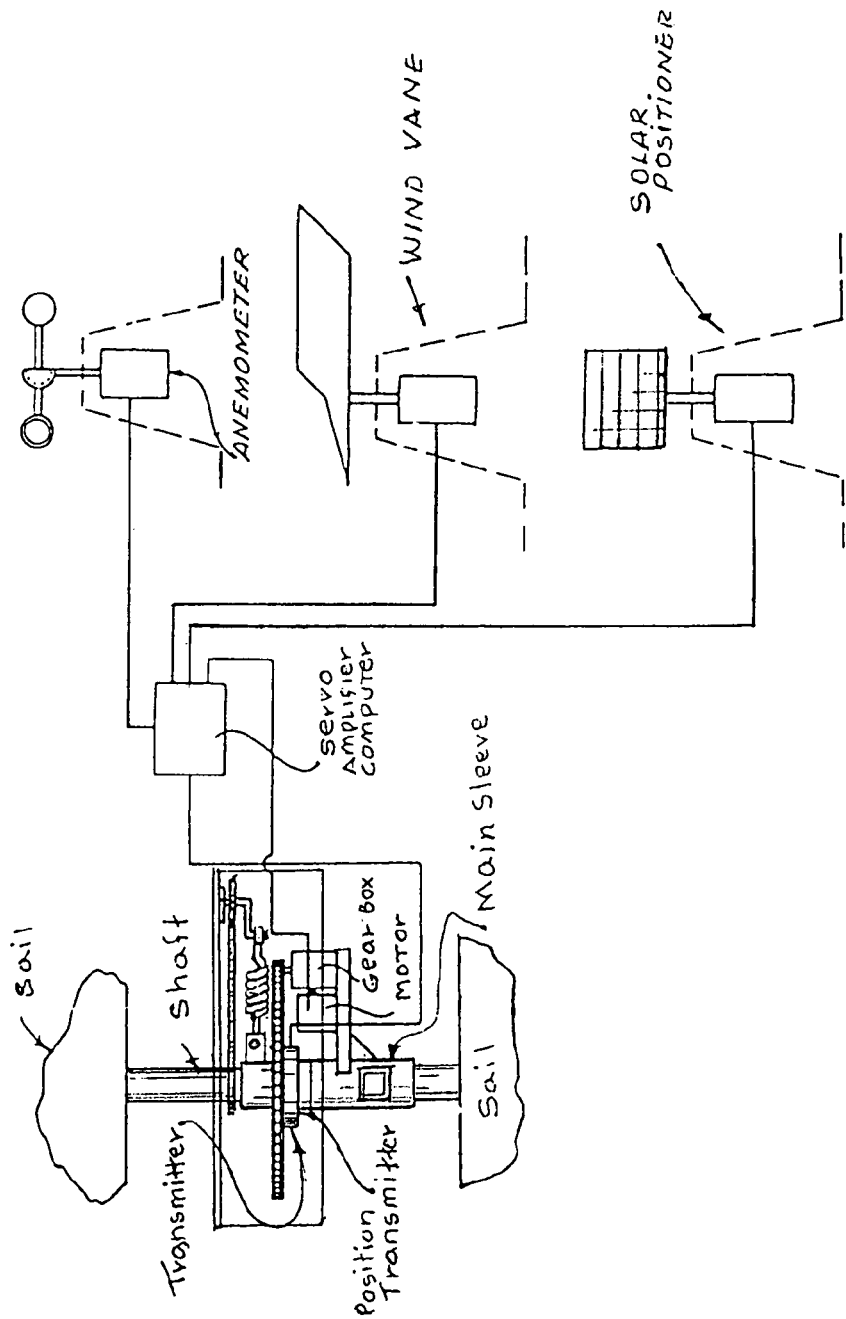
FIG. 19 is a schematic representation of a power generation assembly showing an anemometer, a wind vane and a solar positioner with computer, servo and respective connections.
Figure 20:
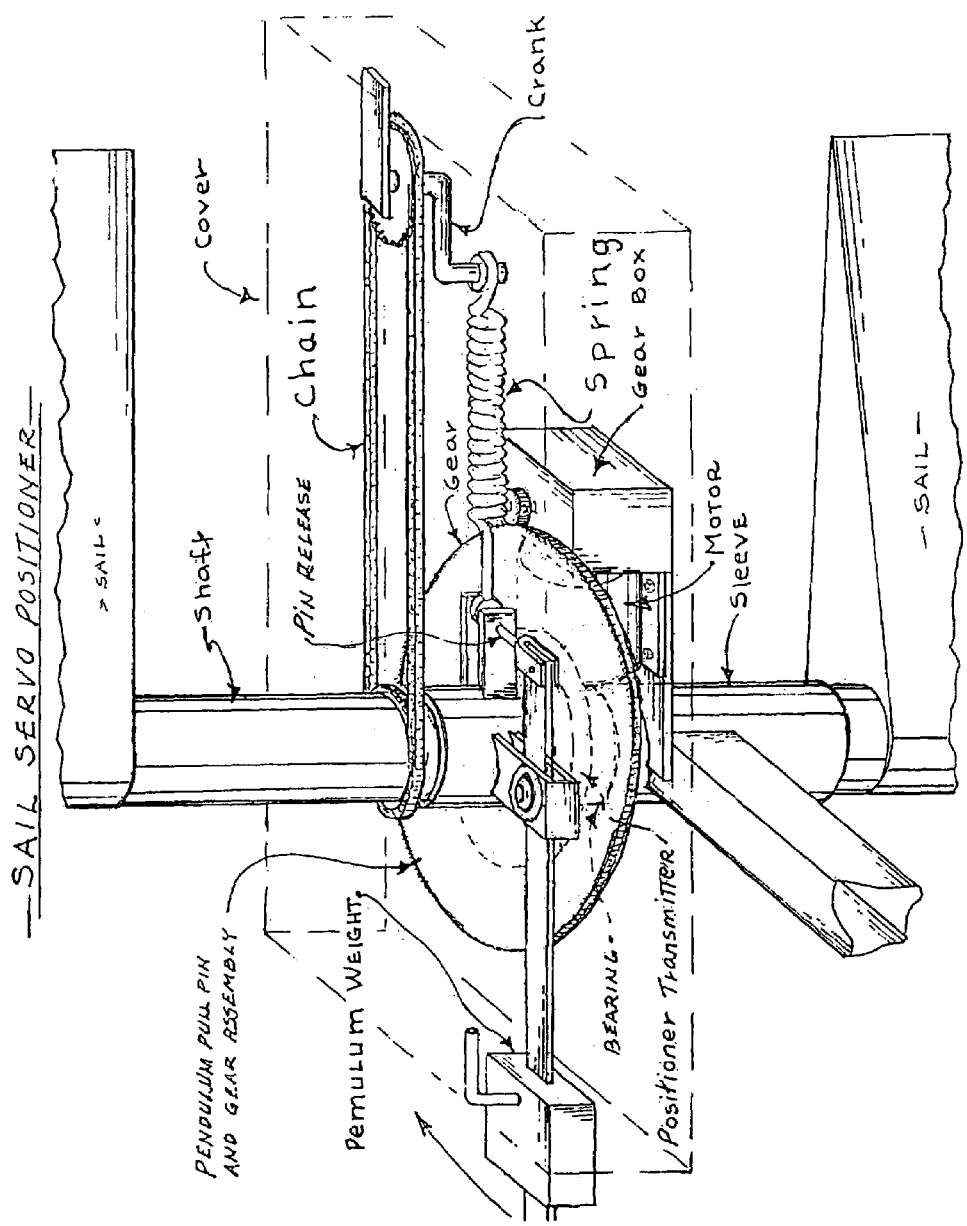
FIG. 20 is an expanded view of a bias mechanism with a pull pin pendulum for feathering the sail.

FIGS. 14 and 15 depict a water-driven power generation assembly according to the present invention. It is noted that the operation of the car assembly 40, generating system 52 and rail 32 is essentially the same as in the wind driven system outlined above. The water vanes 74 operate essentially the same as the airfoils 38 discussed above, with the main exception being that the water vanes 74 harness energy from water currents rather than wind currents.

As is seen in FIGS. 14 and 15, all mechanical parts are enclosed in a substantially water-free environment. Air tanks 70 are built into the structure to maintain buoyancy, and computer pressure regulators 82 along with an air pump 80 supply the tanks 70 with sufficient air to maintain leveling. An air line 78 is in communication with the surface air supply.

It is noted that an additional advantage of the present invention is the distance between the guide wheels 44 in the car assembly 40. The guide wheels 44 are set far enough apart to allow drive wheel 54 construction within the rail 32. This guide wheel 44 configuration also enables drive system and generator to be enclosed and provides greater stability and strength, reducing cantilevering.

Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A power generation assembly for use in generating electrical power from air or water currents, comprising:
   a) a rail system;
   b) a vane assembly, having a frame and at least one vane configured to interact with said currents to produce a force:
   c) a car assembly, slidably mounted to the rail, including a first and second guide wheels and a longitudinal axis element running between the first and second guide wheels and a linkage portion coupled to the frame, the force being useable to move the car assembly with respect to the rail system;
   d) a power-take-off device operatively coupled to the car assembly, positioned intermediate the vane assembly and the rail system and located no farther away from the rail system toward the vane assembly than is the longitudinal axis element of the car, said power-take-off device being configured so that it rotates around the rail system; and
   e) a generating system having:
      i) a generator; and
      ii) at least one drive wheel operatively coupled to the generator, and engaged by the power-take-off device; the generator being driven when the power-take-off device moves with respect to the rail system, turning said drive wheel, a relationship of said drive wheel to said power-take-off device being that of a wheel being turned by a translating comparatively straighter element tangent to said wheel.

2. The power generation assembly of claim 1, wherein the power-take-off device pivotally connects the car assembly to at least one additional car assembly.

3. The power generation assembly of claim 1, wherein the power-take-off device comprises a beam.

4. The power generation assembly of claim 1, wherein the power-take-off device is coupled to the longitudinal axis element.

5. The power generation assembly of claim 1, wherein the power-take-off device comprises a multiplicity of pivotably linked connector elements, each of which has a tongue at a first end and a groove at an opposite end, such that each power-take-off connector element may pivotally engage an adjacent power-take-off connector element in a tongue-and-groove coupling.

6. The power generation assembly of claim 1, wherein the rail system comprises a monorail 7. The power generation assembly of claim 1, wherein the vane is configured to interact with an air flow.

8. The power generation assembly of claim 1, wherein the vane is configured to interact with a water flow.

9. A power generation assembly configured for generating electrical power from at least one of wind and water currents, including:
   a) a rail system comprising a rail in a continuous loop;
   b) a vane assembly, having a frame and at least one vane configured to cooperate with said at least one of wind and water currents to produce force acting on the frame;
   c) a car assembly including a multiplicity of cars pivotably interconnected to form a continuous loop, said car assembly including a first and second guide wheels and a longitudinal axis element running between the first and second guide wheels, said car assembly being movably carried by the rail system and said car assembly being connected to said frame of the vane assembly whereby said force can be transferred to the car assembly and move it along the continuous loop;
   d) a power take off element operably connected with the car assembly, and being positioned intermediate the vane assembly and the rail system and located no farther away from the rail system toward the vane assembly than is the longitudinal axis element of the car assembly, the power take off element comprising a continuous loop which interacts with at least one drive wheel to transfer moving force from the car assembly through the power takeoff element and drive wheel to
   e) a generator, configured to generate electrical energy, said drive wheel being frictionally engaged with said power-take-off element so that as the power-take-off element translates past the drive wheel and the drive wheel rotates allowing transfer of energy from the car assembly to the generator, the assembly converting a portion of the energy of said currents into electrical energy.

10. The power generation assembly of claim 9, further comprising another wheel engaged with the power-take-off element at a position that it rotates in the opposite direction of the drive wheel and said power-take-off element is positioned intermediate said wheels.

11. The power generation assembly of claim 10, wherein both of said wheels can function as drive wheels.

12. The power generation assembly of claim 9, wherein a car includes at least one carrier wheel and one guide wheel.

13. The power generation assembly of claim 12, wherein a car includes at least two guide wheels.

14. The power generation assembly of claim 12, wherein said rail is configured so that the carrier wheel and the guide wheel can travel inside the rail.

15. The power generation assembly of claim 14, wherein the carrier wheel can pivot with respect to the car.

16. The power generation assembly of claim 9, wherein the vane assembly can be removed from the car assembly.

17. The power generation assembly of claim 9, further comprising a feathering device enabling feathering of the vane.

18. A power generation assembly for use in generating electrical power from air or water currents, comprising:
   a) a rail system;
   b) a vane assembly, having a frame and at least one vane configured to interact with said currents to produce a force:
   c) a car assembly, slidably mounted to the rail, including a linkage portion coupled to the frame, the force being useable to move the car assembly with respect to the rail system;
   d) a power-take-off device operatively coupled to the car assembly, said power-take-off device being configured so that it rotates around the rail system; and
   e) a generating system having:
      i) a generator; and
      ii) at least one drive wheel operatively coupled to the generator, and engaged by the power-take-off device; the generator being driven when the power-take-off device moves with respect to the rail system, turning said drive wheel, and
   wherein the power-take-off device comprises a multiplicity of pivotably linked connector elements, each of which has a tongue at a first end and a groove at an opposite end, such that each power-take-off connector element can pivotally engage an adjacent power-take-off connector element in a tongue-and groove coupling.

* * * * *